(12) United States Patent
Chiao

(10) Patent No.: US 7,119,454 B1
(45) Date of Patent: Oct. 10, 2006

(54) SYSTEM AND METHOD FOR POWERING ACCESSORIES IN A HYBRID VEHICLE

(75) Inventor: Sheng Chiao, San Diego, CA (US)

(73) Assignee: ISE Corporation, Poway, CA (US)

( * ) Notice: Subject to any disclaimer, the term of this patent is extended or adjusted under 35 U.S.C. 154(b) by 494 days.

(21) Appl. No.: 10/160,877

(22) Filed: May 31, 2002

(51) Int. Cl.
*B60L 1/00* (2006.01)

(52) U.S. Cl. ...................................... 307/9.1

(58) Field of Classification Search ............... 307/10.1, 307/9.1; 180/65.3
See application file for complete search history.

(56) References Cited

U.S. PATENT DOCUMENTS

| | | | |
|---|---|---|---|
| 6,223,844 B1 * | 5/2001 | Greenhill et al. | 180/65.3 |
| 6,404,150 B1 * | 6/2002 | Nehl et al. | 318/34 |
| 6,484,830 B1 * | 11/2002 | Gruenwald et al. | 180/65.2 |
| 6,515,872 B1 * | 2/2003 | Nakayama et al. | 363/17 |
| 6,544,009 B1 * | 4/2003 | Makino et al. | 417/312 |
| 2002/0179349 A1 * | 12/2002 | Field | 180/65.2 |
| 2003/0030338 A1 * | 2/2003 | Beishline et al. | 310/75 R |

OTHER PUBLICATIONS

SuperWinch Owner's Manual for X9 12 & 24 Volt DC Electric Winch Models 1901, 1902; Rev. J, Published Jun. 22, 2001, pp. 1-21.*
Advertisement for SuperWinch Model 2000 P/N 1723 and Model 1000 P/N 1401 copyrighted in 2001.*
SuperWinch Owner's Manual for Models AC2000 and 3000; Published Jul. 18, 2005, pp. 1-15.*

* cited by examiner

*Primary Examiner*—Robert L. Deberadinis
(74) *Attorney, Agent, or Firm*—Stephen C. Beuerle; Procopio Cory Hargreaves & Savitch LLP

(57) ABSTRACT

A system and method for providing power to vehicle accessories having operational power requirements in excess of 1 kilowatt. The system is employed in conjunction with a vehicle comprising a main power unit and an electric motor, the main power unit providing more than 42 volts of power to a DC power bus from which the electric motor draws power to propel the vehicle. The system comprises a vibration dampening mounting structure affixed to the vehicle. A vehicle accessory requiring operational power in excess of 1 kilowatt and an electric accessory motor are affixed to the mounting structure. The electric accessory motor is mechanically coupled to the vehicle accessory. The electric accessory motor draws electric power from the DC power bus to provide operational power to the vehicle accessory. The vehicle accessory can be a scroll type air compressor.

33 Claims, 9 Drawing Sheets

SYSTEM AND METHOD FOR POWERING ACCESSORIES IN A HYBRID VEHICLE

BACKGROUND OF THE INVENTION

1. Field of the Invention

The field of the present invention is generally motor vehicles, and in particular systems within motor vehicles that power vehicle accessories.

2. Background

In conventional vehicles, i.e., vehicles that are neither hybrid vehicles nor electric vehicles, accessories such as hydraulic pumps, water pumps, vacuum pumps, and compressors for air brakes or air conditioning systems are powered directly from the internal combustion engine. The power required by these accessories may be steady over extended periods of time, as in the case of a water pump that is used to help cool the engine, or it may be required in short bursts when needed by the accessory, as in the case of hydraulic accessories or air brakes. Because such accessories have relatively high power requirements, the most economical and efficient source of power for these accessories is the internal combustion engine.

In hybrid vehicles that include an internal combustion engine, either in series or in parallel with the electric motor, these same accessories are often powered from the internal combustion engine in much the same way as in a conventional vehicle. Alternatively, in some hybrid vehicles and in most electric vehicles, the traditional accessories are replaced with a wholly electric version of the accessory to perform the same function, such as an electric air conditioning system or an electrically powered compressed air brake system.

In implementing either of the above solutions to power vehicle accessories, however, inefficiencies are introduced into a vehicle. These inefficiencies may effect the cost of the vehicle, the performance of the vehicle, or both. For example, if a hybrid or electric vehicle includes electric versions of one or more accessories, the inefficiency introduced in the hybrid vehicle is in the overall cost of the vehicle. The increased cost arises because the electric version of an accessory must initially be developed and tested. Additionally, the cost of the electric version of the accessory will typically remain high over a period of one to several years because vehicles which use the electric version of the accessory do not have the high production quantities of conventional vehicles.

Conversely, if a hybrid vehicle implements a vehicle accessory in the traditional manner, i.e., powered directly from an internal combustion engine, the vehicle will experience inefficiencies in fuel economy. The inefficiencies arise when the internal combustion engine provides power directly to the accessories and the electric motor and/or the batteries do not require power. During these periods, the engine necessarily consumes fuel to provide the power required by the accessories. Any excess power generated by the engine, however, is lost because it cannot be otherwise used or stored by the vehicle.

SUMMARY OF THE INVENTION

The present invention is directed to a system and method for driving vehicle accessories having operational power requirements in excess of 1 kilowatt. The system and method are used in conjunction with a vehicle comprising a main power unit and an electric motor. The main power unit provides more than 42 volts of power to a DC power bus and the electric motor draws power from the DC power bus to propel the vehicle. The system for providing power to the vehicle accessories comprises a vibration dampening mounting structure and an electric accessory motor. The electric accessory motor is electrically coupled to the DC power bus and mechanically coupled to a vehicle accessory to provide operational power to the vehicle accessory. The electric accessory motor and the vehicle accessory are affixed to the vibration dampening mounting structure, and the vibration dampening mounting structure is affixed to the vehicle. The vibration dampening mounting structure may be affixed to any advantageous location on the vehicle, including inside or outside of an engine compartment.

The types of vehicle accessories that may be driven using the system of the present invention include compressors, such as brake air compressors or air conditioning compressors, hydraulic pumps, such as those used for power steering or other heavy duty hydraulic equipment, water pumps, and vacuum pumps. Each of these types of vehicle accessories have operational power requirements that exceed 1 kilowatt, and each may be of the same type used in conventional vehicles that are powered by internal combustion engines.

The method of providing power to the vehicle accessories comprises mechanically coupling an electric accessory motor to a vehicle accessory requiring in excess of 1 kilowatt of operational power. The electric accessory motor is also electrically coupled to the DC power bus. The electric accessory motor and the vehicle accessory are mounted to the vehicle using a vibration dampening means. The electric accessory motor draws power from the DC power bus to drive the vehicle accessory.

Other aspects, advantages, and novel features of the invention will become apparent from the following Detailed Description of Preferred Embodiments, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION OF THE PREFERRED EMBODIMENTS

Figure 1A:
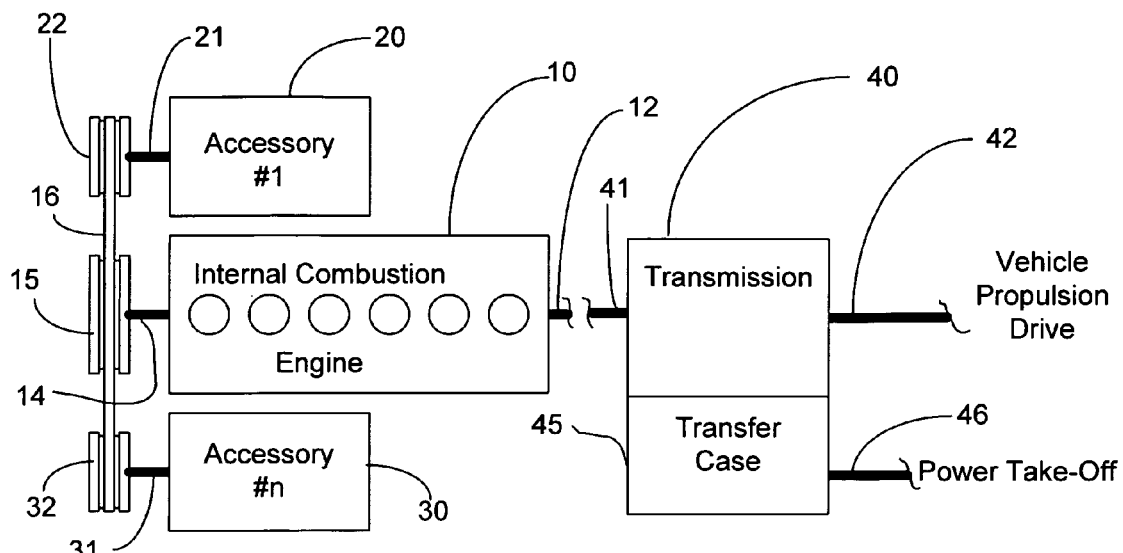
FIGS. 1a–1c schematically illustrate systems of driving vehicle accessories according to the prior art.
Figure 1B:
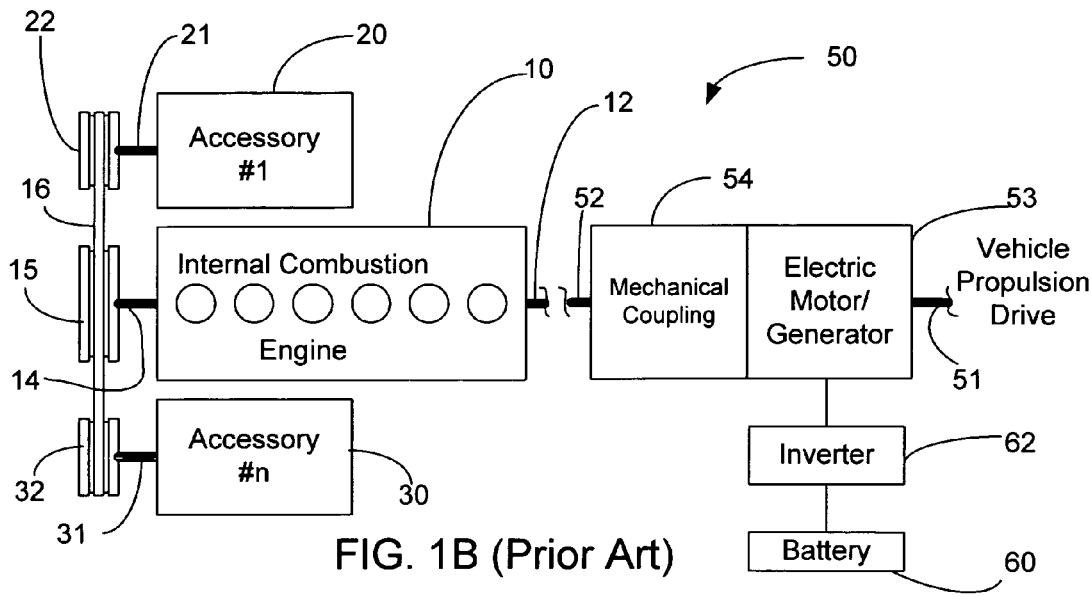
Figure 1C:
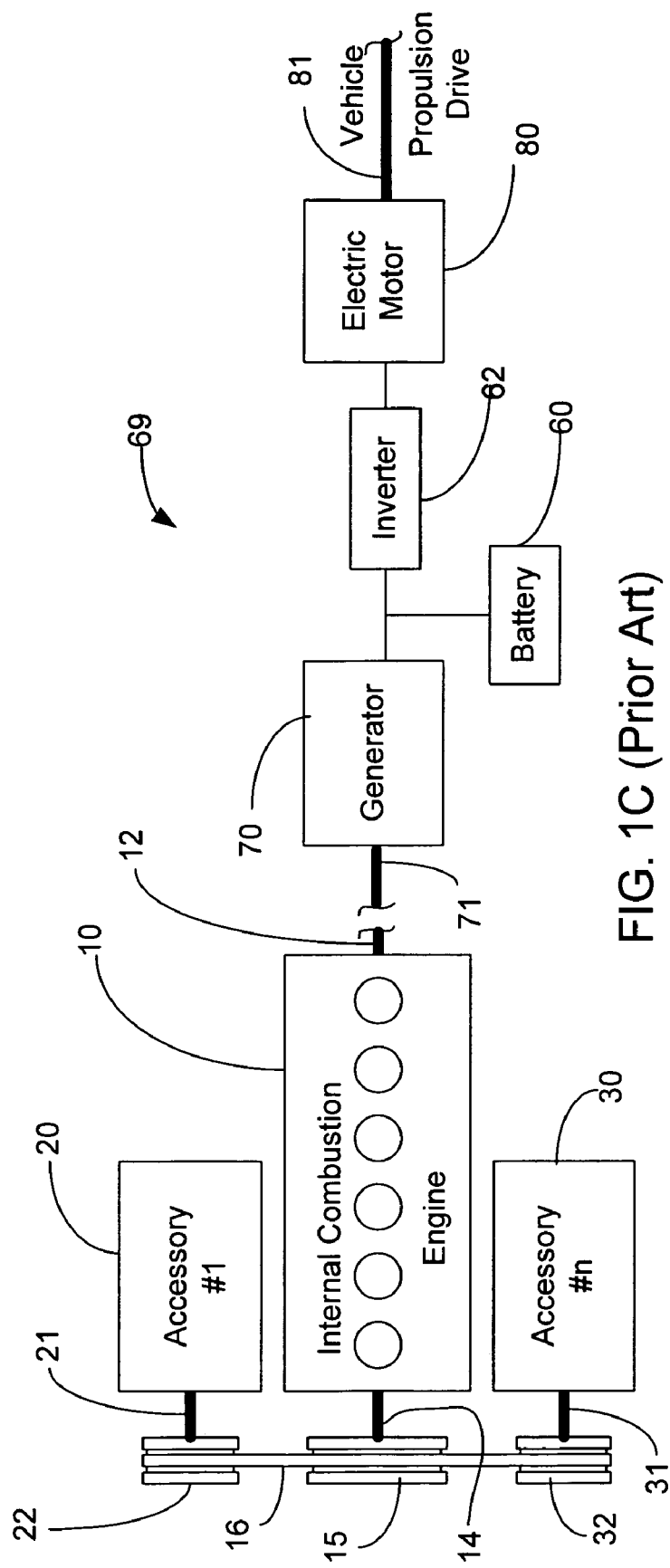

Turning in detail to the drawings, FIGS. 1a–1c illustrate systems of driving vehicle accessories as practiced in the prior art. FIG. 1a schematically illustrates a conventional vehicle 9 (e.g., a passenger car, a light truck, a heavy duty vehicle such as a refuse collection truck or transit bus, or other type of vehicle) having an internal combustion engine 10. The internal combustion engine has two output shafts 12, 14. The first output shaft 12 is coupled to an input shaft 41 of a transmission 40 that may be used to propel the vehicle using a drive shaft 42. Alternatively, the power provided to the transmission 40 may be directed into a transfer case 45 and used to drive a power take-off shaft 46. The power take-off shaft 46 may be used, for example, to drive an additional axle in a four-wheel drive vehicle or to drive a hydraulic pump used in conjunction with heavy duty equipment such as the lift mechanism in a dump truck or a compactor in a refuse collection truck.

The second output shaft 14 of the internal combustion engine drives accessories 20, 30 using a belt drive assembly. The belt drive assembly comprises a first pulley 15, affixed to the output shaft 14 of the internal combustion engine, a belt 16 that connects the first pulley 15 to two receiving pulleys 22, 32 that are in turn affixed to input shafts 21, 31 of accessories 20, 30, respectively. Additional receiving pulleys and accessories may also be included. The accessories 20, 30 in a conventional vehicle often include, for example, a compressor for an air conditioner or air brakes, a water pump, an alternator to recharge the starting battery and provide accessory power, or a hydraulic pump for power steering.

FIG. 1b schematically illustrates a hybrid vehicle 50 having a parallel drive system as practiced in the prior art. The parallel hybrid vehicle 50 includes an internal combustion engine 10 to drive the accessories 20, 30 in the same manner as the conventional vehicle 9 of FIG. 1a. The output shaft 12 of the internal combustion engine 10 is coupled to an input shaft 52 of a mechanical coupling 54. The mechanical coupling 54 is also coupled to an electric motor 53 with an integrated generator. The electric motor may power the drive shaft 51 using power provided by a battery 60 through an inverter 62 or, alternatively, the internal combustion engine 10 may power the drive shaft 51 through the mechanical coupling 54. When the internal combustion engine 10 powers the drive shaft 51, the generator integrated into the electric motor 50 may be used to store power in the battery 60.

FIG. 1c schematically illustrates a hybrid vehicle 69 having a series drive system as practiced in the prior art. The series hybrid vehicle 69 includes an internal combustion engine 10 to drive the accessories 20, 30 in the same manner as the conventional vehicle 9 of FIG. 1a. The output shaft 12 of the internal combustion engine 10 is coupled to an input shaft 71 of a generator 70. When driven by the internal combustion engine 10, the generator 70 provides electrical power to a battery 60 and an inverter 62. The battery may provide electrical power to the inverter 62 when the generator 70 is not operating. The inverter 62 is electrically coupled to an electric motor 80 that propels the vehicle 69 via a drive shaft 81.

Figure 2:
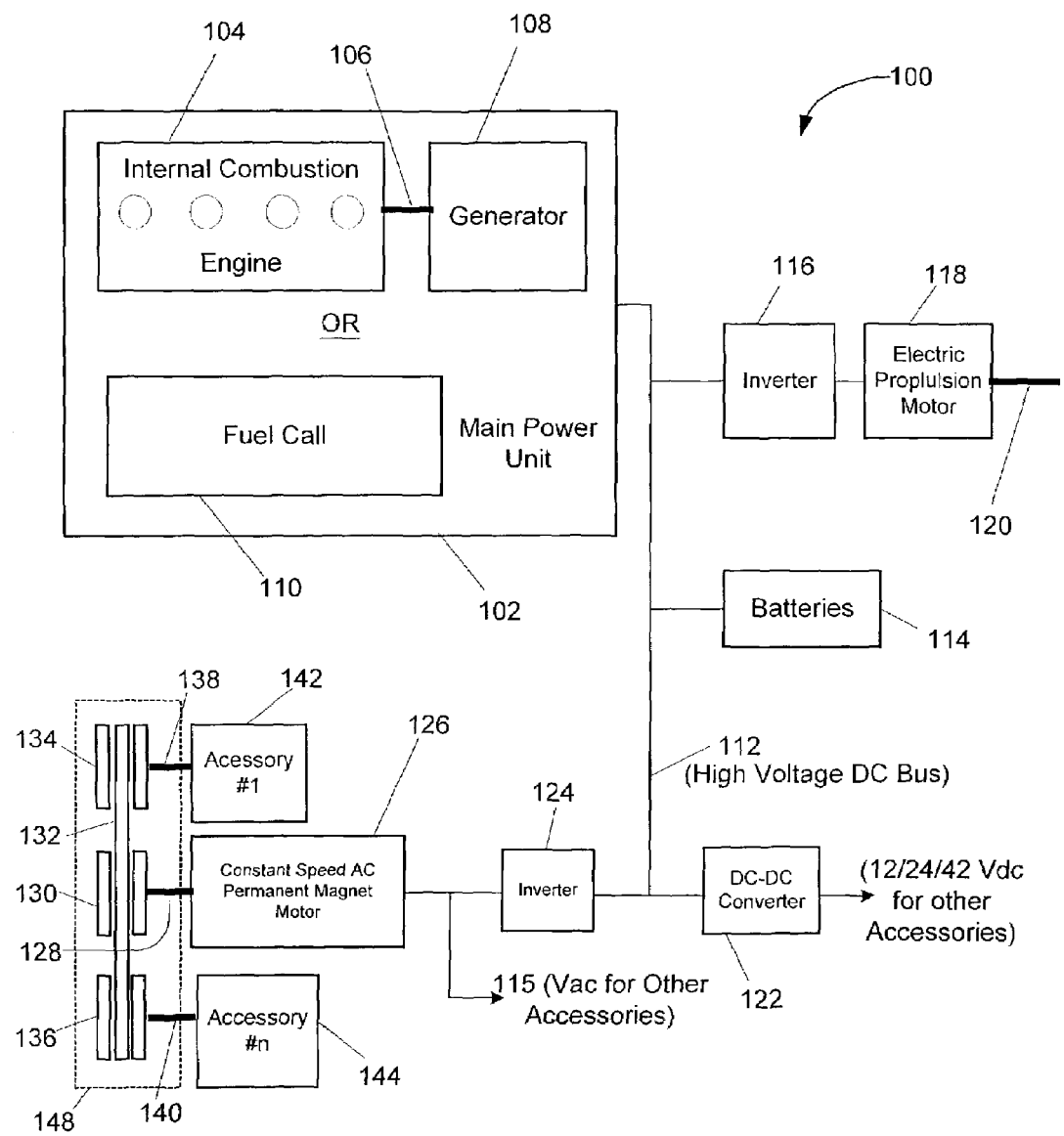
FIG. 2 schematically illustrates a system of driving vehicle accessories in accordance with an embodiment of the present invention.

FIG. 2 schematically illustrates an embodiment of a system 100 configured to power vehicle accessories 142, 144, in accordance with the systems and methods disclosed herein. System 100 is preferably incorporated into a series hybrid vehicle 100, but system 100 can be incorporated into other types of vehicles. The system 100 has a main power unit 102 with at least one power generating source that provides more than 42 volts of power to a high voltage DC power bus 112. The power generating source can comprise an internal combustion engine 104 coupled to a generator 108 through a drive shaft 106, a fuel cell 110, a microturbine (not shown) or any other appropriate power source.

One or more batteries 114 are electrically coupled to the DC power bus 112 to store power generated by the main power unit 102. A first inverter 116 is electrically coupled to the DC power bus 112 to provide AC power to the electric motor 118 that propels the hybrid vehicle using a drive shaft 120. Preferably a DC converter 122 is included in system 100 to step the high voltage of the DC power bus 112 down to an appropriate level required by low voltage accessories that may be included in the hybrid vehicle. For example DC to DC connector 122 can be configured to provide 12, 24, or 42 volts to various low voltage accessories.

A second inverter 124 is coupled to the DC power bus 112 to provide AC power to an electric accessory motor 126. The output shaft 128 of the electric accessory motor 126 drives the vehicle accessories 142, 144 using a belt drive assembly 148. The electric accessory motor 126 provides a total power output that exceeds the operational power requirements of any vehicle accessories 142, 144, and preferably the electric accessory motor 126 is capable of providing a total power output that exceeds the combined maximum power ratings of the vehicle accessories 142, 144. The belt drive assembly 148 comprises a first pulley 130, affixed to the output shaft 128 of the electric accessory motor 126, a belt 132 that connects the first pulley 130 to two receiving pulleys 134, 136, each receiving pulley 134, 136 being affixed to an input shaft 138, 140 of one of the accessories 142, 144. Additional receiving pulleys and accessories may also be included. The electrical rating of Accessory motor 126 is preferably based upon the operational power requirements of the accessories affixed to the belt drive assembly 148.

Examples of vehicle accessories that may be advantageously powered by the electric accessory motor 126 include air compressors, water pumps, hydraulic pumps, vacuum pumps, or other accessories that have operational power requirements in excess of 1 kilowatt. In the case of an air compressor, a piston-type air compressor can be used, or more preferably, a scroll-type air compressor can be used. Such accessories are traditionally powered directly from the internal combustion engine in a conventional vehicle because of their relatively high power requirements.

An advantage to using electric accessory motor 126 is that the internal combustion engine 104 can be shut down when the vehicle and its accessories 142 and 144 are adequately powered by the batteries. Thus, with the high power accessories 142 and 144 being driven by the accessory motor 126, the internal combustion engine 104 may be operated less frequently than if the accessories 142 and 144 are driven directly from the internal combustion engine 104 which results in greater fuel efficiency. Additionally, because each of these high power accessories 142 and 144 may be of the same shaft driven type typically used in conventional vehicles, significant savings may be realized in the overall cost of the vehicle. These cost savings arise through economies of scale that are already in place for the shaft driven version of the high power accessories 142 and 144, as compared to the development and manufacturing infrastructure that exists for entirely electronic versions of these same accessories.

An additional advantage of driving the high power accessories 142 and 144 with a separate accessory motor 126 is that the accessories 142 and 144 can be affixed to any location on the vehicle. The aforementioned high power accessories are often mounted within the engine compartment in a conventional vehicle. Thus, not only do the accessories 142 and 144 share the same compartmental space with the engine, but they also share the same dirt, dust, high temperature, and vibrations present within the engine compartment, most of which is created by the internal combustion engine. By powering the vehicle accessories 142 and 144 with a separate accessory motor 126, the vehicle accessories 142 and 144 can be mounted anywhere on or in the vehicle, thus making the accessories 142 and 144 more accessible and removing them from an environment that contributes to wear and tear.

Figure 3A:
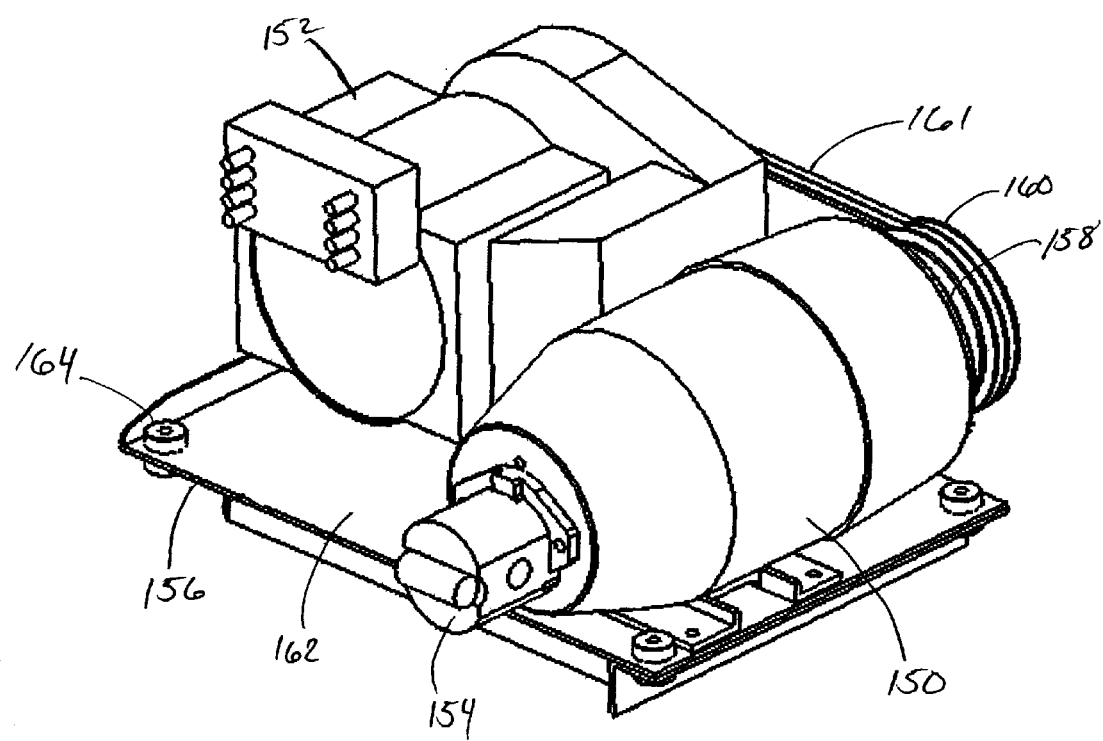
FIGS. 3a and 3b illustrate a mounting structure for two vehicle accessories, a scroll air compressor and a hydraulic pump, driven by a single accessory motor.

FIG. 3a illustrates an accessory motor 150 coupled to a scroll-type air compressor 152 and a hydraulic pump 154, all of which are affixed to a vibration dampening mounting structure 156. The shaft (not shown) of the accessory motor 150 is accessible from two opposite sides of the accessory motor. On one side, the accessory motor 150 is mechanically coupled to the air compressor 152 using a clutch 158, which can be of any appropriate type, pulley 160, and belt 161 mechanism. With this type of coupling, the air compressor 152 may be driven at any time simply by engaging the clutch 158. On the opposite side, the mechanical coupling between the accessory motor 150 and the hydraulic pump 154 is a direct shaft connection. Thus, when the accessory motor 150 is operative, operational power is provided to the hydraulic pump 154. The type of mechanical coupling is chosen to best serve the needs of the vehicle with which the accessories are used. Therefore, many alternative types of mechanical couplings can be employed.

Figure 3B:
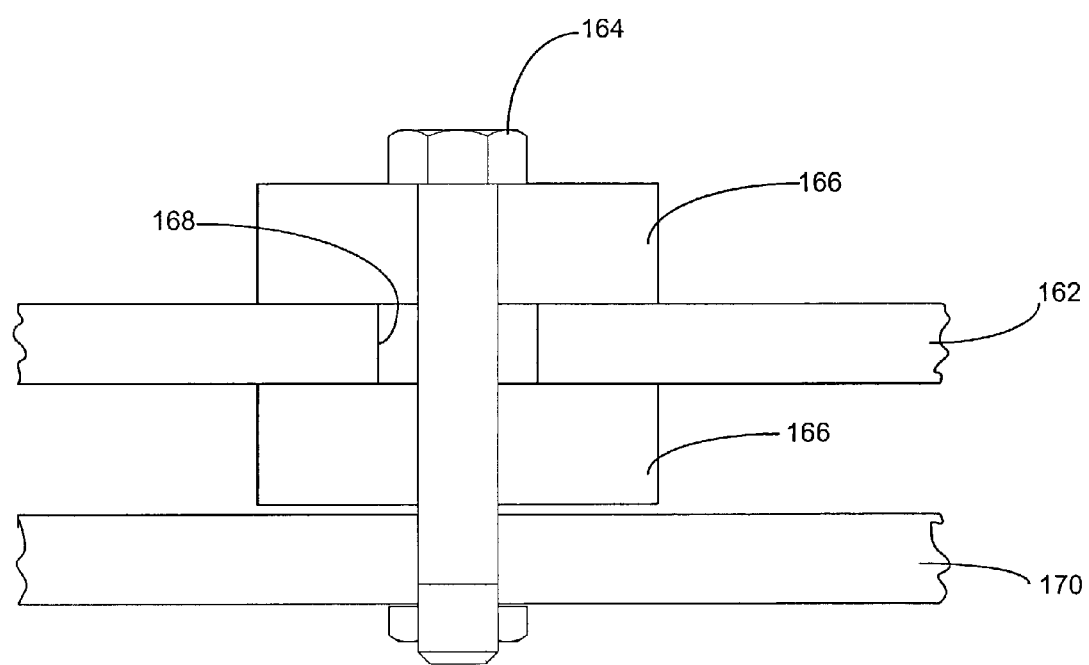

The vibration dampening mounting structure 156 of FIG. 3a comprises a plate 162 and mounting bolts 164 to affix the plate to the vehicle in the manner shown in FIG. 3b. The mounting bolts 164 are vibrationally isolated from the mounting plate 162 by interposing a vibration dampening material 166, such as rubber, between the mounting bolts 164 and the mounting plate 162. Additionally, each bolt extends through a hole 168 in the mounting plate 162, without having physical contact with the mounting plate, and is affixed to supporting structure 170 of the vehicle. Thus, vibrations that would otherwise travel between the vehicle and the accessories are largely absorbed by the vibration dampening material. Other vibration isolation and dampening techniques can also be employed.

An advantage of having the accessory motor 150 and the accessories 152 and 154 affixed to the vibration dampening mounting structure 156 is that the vibration dampening mounting structure can be affixed to the vehicle either within the engine compartment or external to the engine compartment. Additionally, the vibration dampening mounting structure 156 may be mounted at any desired orientation relative to the vehicle because no overly restrictive mechanical connections (i.e., a drive shaft connection) are required. Regardless of where and how the vibration dampening mounting structure 156 is mounted, the electrical coupling between the electric accessory motor 150 and the DC power bus, e.g., bus 112, is easily accomplished using insulated wires. Other connections required by certain accessories, such as a compressed air or pressurized fluid line, are also easily made regardless of where on the vehicle the accessories are affixed.

Figure 4:
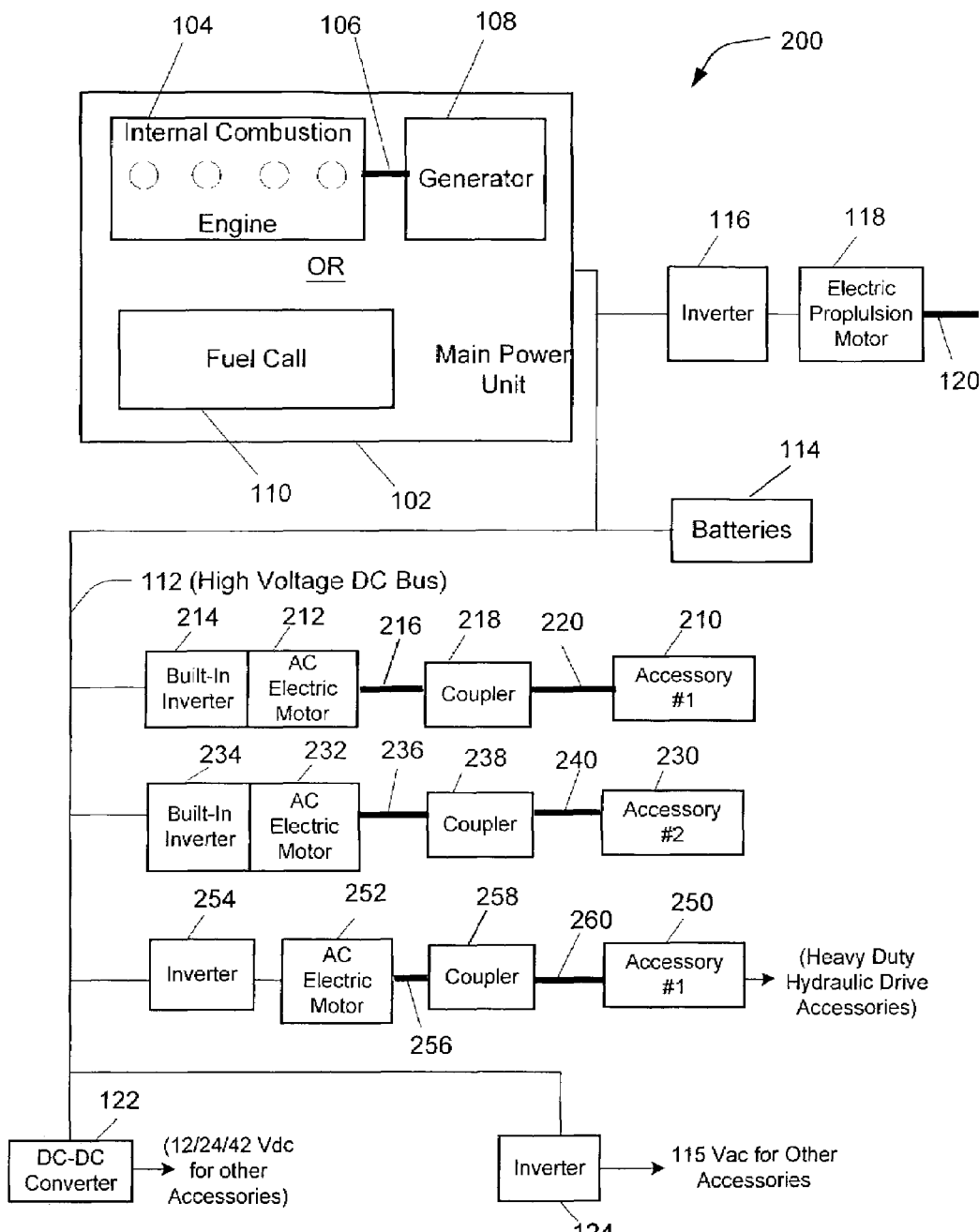
FIG. 4 schematically illustrates a system of driving vehicle accessories in accordance with another embodiment of the present invention.

FIG. 4 schematically illustrates an alternative embodiment of a system 200 configured to power vehicle accessories 210, 230, and 250. Preferably, system 200 is incorporated into a series hybrid vehicle. System 200 includes a main power unit 102 that powers a high voltage DC power bus 112. In this example, however, and each vehicle accessory 210, 230, and 250 is driven by a separate accessory motor 212, 232, and, 252, respectively. Each motor 212, 232, and 252 draws power from the DC power bus 112. For the first accessory 210, the AC motor 212 is preferably integrated with an inverter 214 and electrically coupled, through the inverter 214, to the DC power bus 112. The AC motor 212 also preferably includes an output shaft 216 that is connected to an input shaft 220 of the accessory 210 through a mechanical coupler 218. The mechanical coupler 218 can comprise a pulley and belt mechanism, a shaft-to-shaft coupler, a clutch, or any other type of appropriate mechanical coupler. The mechanical coupler 218 and the AC motor 212 for the first accessory 210 are also preferably chosen to suit the power and usage requirements of the first accessory 210.

In the example illustrated in FIG. 4, the second accessory 230 is driven in the same manner as the first accessory 210. An AC motor 232 with an integrated inverter 234 is electrically coupled to the DC power bus 112. The output shaft 236 of the AC motor 232 drives an input shaft 240 of the second accessory 230 through a mechanical coupler 238. The mechanical coupler 238 and the AC motor 232 for the second accessory 230 are chosen to suit the power and usage requirements of the second accessory 230. Thus, the AC motor 232 driving the second accessory 230 may have a different power rating than the AC motor 212 driving the first accessory 210.

The third accessory shown in FIG. 4 is a hydraulic pump 250 for heavy duty hydraulic equipment, for example, such as a refuse compactor or a lift mechanism. An inverter is preferably electrically coupled to the DC power bus 112 and to an AC motor 252 to provide power to the AC motor 252. The output shaft 256 of the AC motor 252 preferably drives the input shaft 260 of the hydraulic pump 250 through a mechanical coupler 258. The mechanical coupler 258 and the AC motor 252 for the hydraulic pump 250 are preferably chosen to suit the power and usage requirements of the hydraulic pump 250. Additional AC motors may be coupled to the DC power bus to drive additional accessories as needed.

Figure 5:
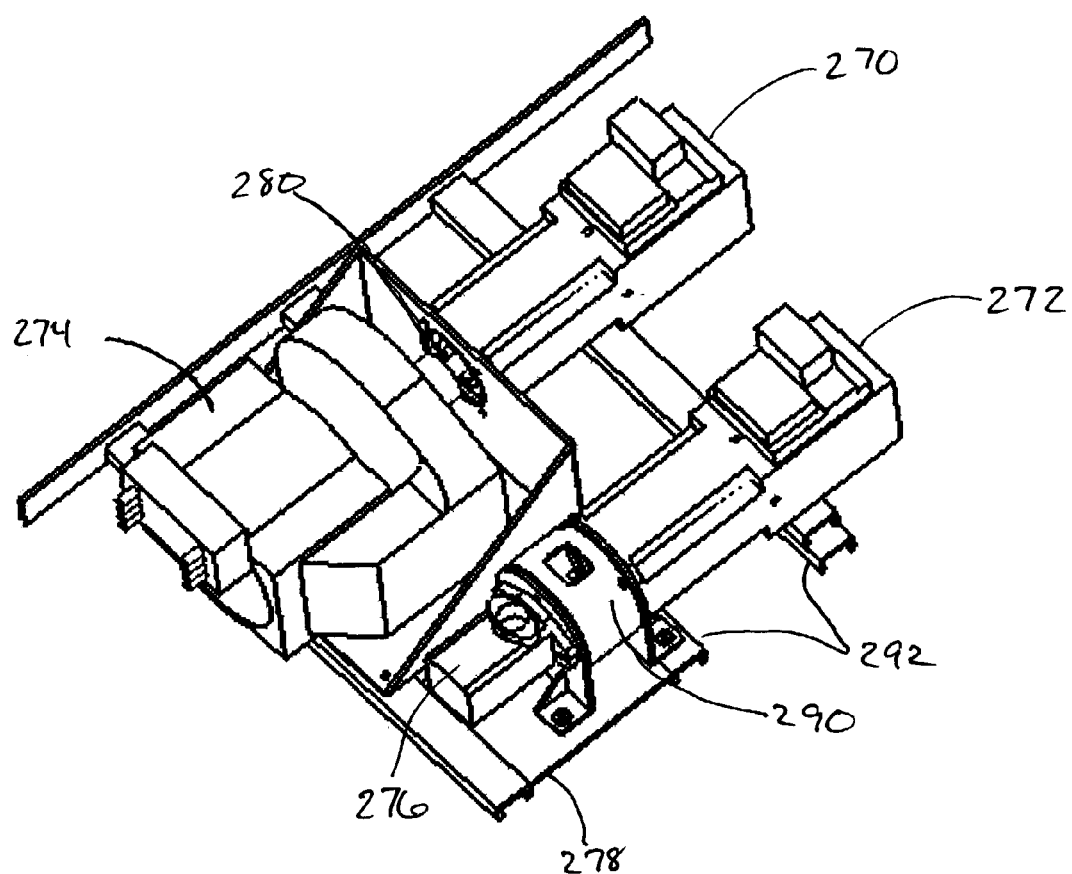
FIG. 5 is a perspective view of a mounting structure for two vehicle accessories, a scroll air compressor and a hydraulic pump, driven by separate accessory motors.
Figure 6:
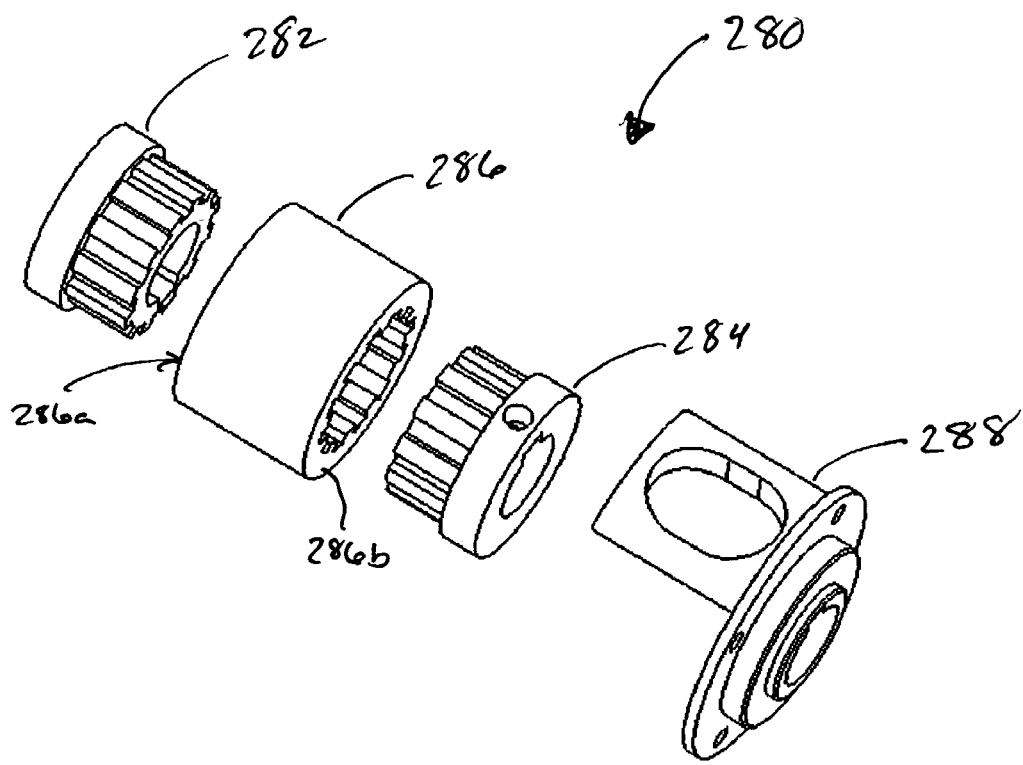
FIG. 6 is an exploded view of a gear assembly used to couple a vehicle accessory to an accessory motor.

FIG. 5 illustrates a multi-accessory motor implementation comprising first and second accessory motors 270 and 272 coupled to a scroll-type air compressor 274 and a hydraulic pump 276, respectively. Both motors 270 and 272 as well as compressor 274 and pump 276 are affixed to a vibration dampening mounting structure 278. The first accessory motor 270 is mechanically coupled to the air compressor 274 using a gear assembly 280. The gear assembly 280 is illustrated in FIG. 6. The gear assembly 280 comprises first and second gears 282, 284, a sleeve 286, and a counter-mass 288. Counter-mass 288 is specifically configured to be used with the sleeves 286 and gears 282, 284. Thus, counter-mass 288 preferably replaces a standard counter-mass that is normally used with a scroll air compressor. The first gear 282 is affixed to the output shaft of the accessory motor, and the second gear 284 is affixed to the input shaft of the scroll air compressor 274.

The sleeve 286 is preferably made out of a flexible material such as neoprene. A first side 286a of the sleeve 286 is preferably formed to mate with the teeth of the first gear 282 and the second side 286b of the sleeve 286 is preferably formed to mate with the teeth of the second gear 284. The teeth of each gear preferably have a depth of at least 3.0 mm, and even more preferably of at least 5.0 mm. The sleeve 286 is preferably manufactured to have a slightly smaller diameter than each gear 282, 284, requiring the material to be slightly stretched when coupled to the gears. As such, the sleeve 286 will fit snugly about the gears 282, 284 to provide a coupling that will not slip under most normal operating conditions. When assembled, a gap is preferably left within the sleeve 286 between the opposing ends of the first and second gears 282, 284. Thus, the flexibility of the sleeve 286 and the gear spacing within the sleeve 286 compensate for shaft misalignments that may occur during normal operation.

Returning to FIG. 5, the second accessory motor 272 is mechanically coupled to the hydraulic pump 276 using a direct shaft-to-shaft connector 290. The accessory motors 270, 272, the hydraulic pump 276, and the air compressor 274 are affixed to a frame 292. The frame 292 is affixed to the vehicle using vibration isolation techniques.

Figure 7:
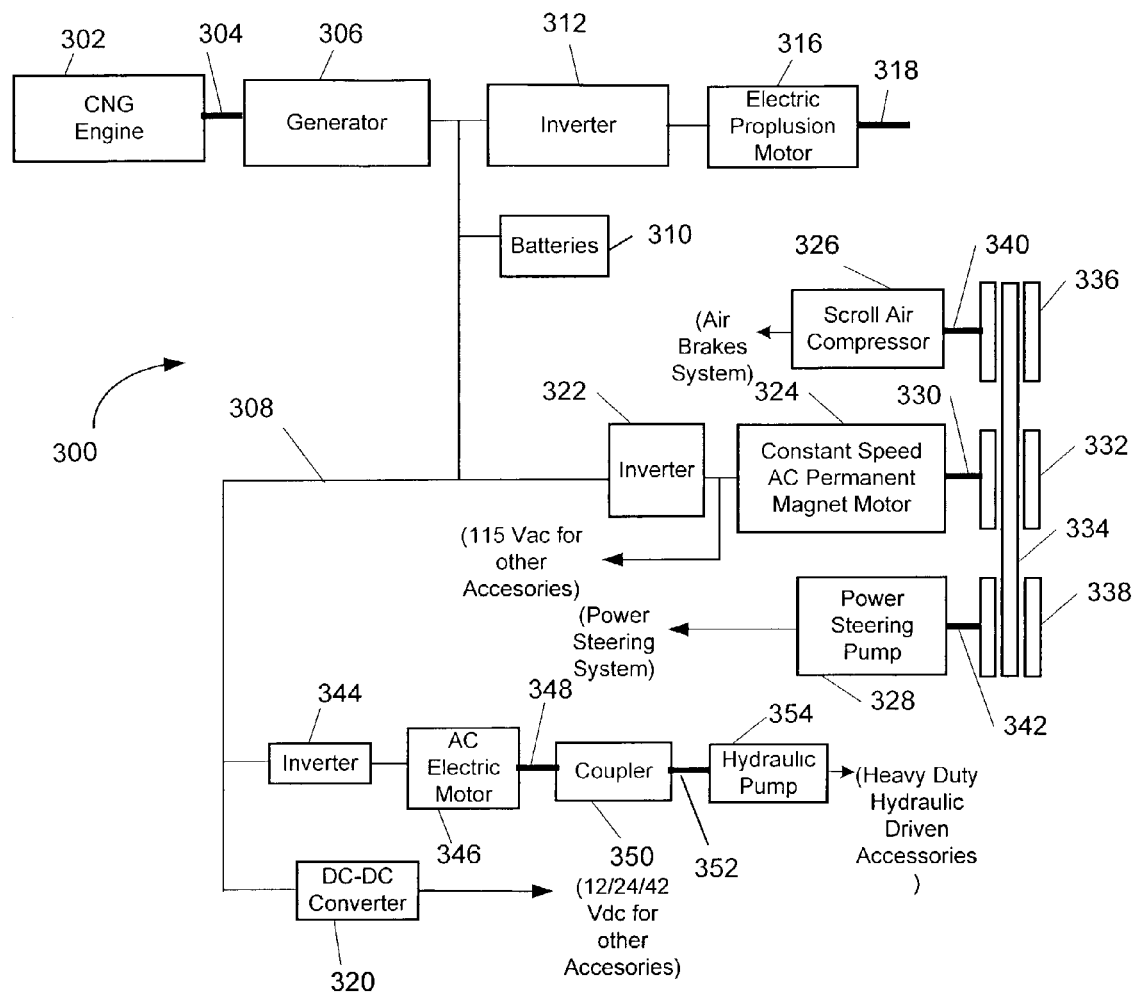
FIG. 7 schematically illustrates a system of driving vehicle accessories in a refuse collection truck in accordance with another embodiment of the present invention.

FIG. 7 schematically illustrates an embodiment of system 300 configured to supply power to accessories within a refuse collection vehicle. The accessories comprise a scroll air compressor 326, a power steering pump 328, and a hydraulic pump 354. In this example, compressor 326 and pump 328 are both driven by electric accessory motor 324, while hydraulic pump 354 is driven by electric accessory motor 346. The vehicle comprises a compressed natural gas engine 302, such as those manufactured by John Deere of Moline, Ill., having an output shaft 304 that is coupled to a generator 306. The generator 306 generates power on a high voltage DC power bus 308. In the example illustrated in FIG. 3, a battery 310, a power converter 320, and a plurality of power inverters 312, 322, 344 are coupled to and receive power from the DC power bus 308. The power converter 320 converts the high voltage DC power to low voltage DC power for use by low voltage accessories as explained with regard to converter 122. Power inverter 312 converts the high voltage DC power to AC power for use by an electric motor 316 that propels the vehicle through a drive shaft 318.

Power inverter 322 converts the high voltage DC power to approximately 115 volt AC power. This second power inverter 322 powers a constant speed AC permanent magnet motor 324 and also provides 115 volt AC power to those vehicle accessories that require such. In this example, the AC motor 324 drives an output shaft 330 that is coupled to a pulley 332. A belt couples the pulley 332 to two receiving pulleys 336 and 338 that are coupled to the input shafts 340 and 342 of the scroll air compressor 326 and the power steering pump 328, respectively. The scroll air compressor 326 provides compressed air for the braking system of the vehicle and the power steering pump 328 provides pressurized hydraulic fluid for the power steering system.

Power inverter 344 converts the high voltage DC power for use by an AC electric motor 346. The output shaft 348 of the AC motor 346 is preferably coupled to an input shaft 352 of a hydraulic pump 354 through a mechanical coupler 350. The hydraulic pump 354 can be a heavy duty pump that provides, for example, the necessary fluid pressurization to operate the lift arms and compactor of the refuse collection vehicle 300. The AC motor 346 and power inverter 344 are thus selected appropriately based upon the power requirements of the hydraulic pump 354.

The scroll air compressor 326, the power steering pump 328, and the associated AC motor 324 can be mounted to a common vibration dampening mounting structure (not shown) and can be advantageously affixed to any appropriate part of the vehicle. The hydraulic pump 354 and its associated AC motor 346 are preferably mounted on another vibration dampening mounting structure (not shown) and can also be advantageously affixed to any appropriate part of the vehicle. Factors that may be considered in determining where to affix the two vibration dampening mounting structures include, for example, isolation from undesirable environments, ease of access in the event repairs become necessary, and convenience based upon the function of each accessory, among others.

Thus, as mentioned, an advantage to the systems and methods disclosed herein is that the electric accessory motors can be powered from battery 114. If the main power unit 102 comprises an internal combustion engine, then inefficiencies in fuel economy can be reduced, because the internal combustion engine does not need to supply power to accessories 142 and 144 when they do not require power. Additionally, because the systems and methods described herein can be implemented with conventional vehicle accessories, cost inefficiencies in hybrid and electric vehicles may be overcome. Accordingly, the systems and methods described herein are not limited to any particular type of vehicle. Rather, the systems and methods described herein can be implemented in any type of vehicle.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A vehicle power system for a heavy-duty hybrid vehicle including an engine compartment and a drive shaft, comprising:
   a main power unit configured to supply a DC power to the heavy-duty hybrid vehicle and located in the engine compartment;
   an electric propulsion motor to propel the heavy-duty hybrid vehicle using the drive shaft;
   a DC bus electrically coupled with the main power unit, the DC bus configured to receive the DC power from the main power unit;
   a vehicle accessory traditionally powered directly from an internal combustion engine of a conventional heavy-duty vehicle and requiring more than 1 kilowatt of power, the vehicle accessory including at least one of a compressor and a pump;
   an electric accessory motor, which is separate from the electric propulsion motor, electrically coupled with the DC bus and mechanically coupled with the vehicle accessory, the electric accessory motor configured to supply power to the vehicle accessory, and the electric accessory motor and vehicle accessory carried by the heavy-duty vehicle outside of the engine compartment.

2. The vehicle power system of claim 1, wherein the electric propulsion motor is electrically coupled with the DC bus, the electric propulsion motor configured to receive power from the high power DC bus and to use the received power to propel the hybrid vehicle using the drive shaft.

3. The vehicle power system of claim 1, further comprising a battery electrically coupled with the DC bus, the battery configured to store power when the main power unit is on and supply power in place of the main power unit when the main power unit is off.

4. The vehicle power system of claim 1, wherein the DC bus is configured to receive more than 42 volts of power from the main power unit.

5. The vehicle power system of claim 1, wherein the heavy-duty hybrid vehicle is a series hybrid-electric transit bus.

6. The vehicle power system of claim 1, wherein the heavy-duty hybrid vehicle is a parallel hybrid-electric transit bus.

7. The vehicle power system of claim 1, wherein the main power unit is housed in the engine compartment, and wherein the vibration dampening structure is mounted outside of the engine compartment.

8. The vehicle power system of claim 1, further comprising a plurality of vehicle accessories traditionally powered directly from an internal combustion engine of a conventional heavy-duty vehicle and each mechanically coupled with the electric accessory motor, the electric accessory motor configured to supply power to each of the plurality of vehicle accessories.

9. The vehicle power system of claim 8, wherein the plurality of vehicle accessories and the electric accessory motor are mounted on a vibration dampening structure, and wherein the vibration dampening structure is mounted to the vehicle.

10. The vehicle power system of claim 9, wherein the main power unit is housed in the engine compartment, and wherein the vibration dampening structure is mounted outside of the engine compartment.

11. The vehicle power system of claim 1, wherein the main power unit comprises an internal combustion engine with a connected electric generator, or a fuel cell.

12. The vehicle power system of claim 1, wherein the vehicle accessory is a scroll air compressor.

13. The vehicle power system of claim 1, further comprising a DC to DC converter electrically coupled with the DC bus, the DC to DC converter configured to convert the DC power supplied by the main power unit to a DC power for use by other low power vehicle accessories.

14. The vehicle power system of claim 1, further comprising an inverter electrically coupled with the DC bus, the inverter configured to convert the DC power supplied by the main power unit to an AC voltage.

15. The vehicle power system of claim 14, wherein the inverter is electrically coupled with the electric accessory motor, and wherein the inverter is configured to supply the AC voltage to the electric accessory motor.

16. The vehicle power system of claim 14, wherein the electric accessory motor comprises the inverter, and wherein the inverter is configured to supply the AC voltage to the electric accessory motor.

17. The vehicle power system of claim 14, wherein the inverter is configured to supply the AC power to other vehicle accessories.

18. A vehicle power system for a heavy duty hybrid vehicle including an engine compartment and a drive shaft, comprising:
    a main power unit configured to supply a DC power of more than 42 volts to the heavy duty hybrid vehicle and located in the engine compartment;
    an electric propulsion motor to propel the heavy duty hybrid vehicle using the drive shaft;
    a DC bus electrically coupled with the main power unit, the DC bus configured to receive the DC power from the main power unit;
    a vehicle accessory traditionally powered directly from an internal combustion engine of a conventional heavy-du vehicle and requiring more than 1 kilowatt of power, the vehicle accessory including at least one of a compressor and a
    an electric accessory motor, which is separate from the electric propulsion motor, electrically coupled with the DC bus and mechanically coupled with the vehicle accessory, the electric accessory motor configured to supply power to the vehicle accessory, and the electric accessory motor and vehicle accessory carried by the vehicle outside of the engine compartment; and
    a vibration dampening structure that the electric accessory motor and vehicle accessory are mounted to, the vibration dampening structure configured to be mounted to the heavy duty hybrid vehicle.

19. The vehicle power system of claim 18, wherein the electric propulsion motor is electrically coupled with the DC bus, the electric propulsion motor configured to receive power from the high power DC bus and to use the received power to propel the heavy duty hybrid vehicle using the drive shaft.

20. The vehicle power system of claim 18, further comprising a battery electrically coupled with the DC bus, the battery configured to store power when the main unit is on and supply power in place of the main power unit when the main power unit is off.

21. The vehicle power system of claim 18, wherein the heavy-duty hybrid vehicle is a series hybrid-electric transit bus.

22. The vehicle power system of claim 18, wherein the main power unit is housed in the engine compartment, and wherein the vibration dampening structure is mounted outside of the engine compartment.

23. The vehicle power system of claim 18, further comprising a plurality of vehicle accessories each requiring more than 1 kilowatt of power and each mechanically coupled with the electric accessory motor, the electric accessory motor configured to supply power to each of the plurality of vehicle accessories.

24. The vehicle power system of claim 23, wherein the plurality of vehicle accessories and the electric accessory motor are mounted on the vibration dampening structure, and wherein the vibration dampening structure is mounted to the vehicle.

25. The vehicle power system of claim 24, wherein the main power unit is housed in the engine compartment, and wherein the vibration dampening structure is mounted outside of the engine compartment.

26. The vehicle power system of claim 18, wherein the heavy-duty hybrid vehicle is a parallel hybrid-electric transit bus.

27. The vehicle power system of claim 18, wherein the main power unit comprises an internal combustion engine with a connected electric generator, or a fuel cell.

28. The vehicle power system of claim 18, further comprising a DC to DC converter electrically coupled with the DC bus, the DC to DC converter configured to convert the DC power supplied by the main power unit to a DC power for use by other low power vehicle accessories.

29. The vehicle power system of claim 18, further comprising an inverter electrically coupled with the DC bus, the inverter configured to convert the DC power supplied by the main power unit to an AC voltage.

30. The vehicle power system of claim 29, wherein the inverter is electrically coupled with the electric accessory motor, and wherein the inverter is configured to supply the AC voltage to the electric accessory motor.

31. The vehicle power system of claim 29, wherein the electric accessory motor comprises the inverter, and wherein the inverter is configured to supply the AC voltage to the electric accessory motor.

32. The vehicle power system of claim 29, wherein the inverter is configured to supply the AC power to other vehicle accessories.

33. The vehicle power system of claim 18, wherein the vehicle accessory is a scroll air compressor.

* * * * *